(12) United States Patent
Ekenbäck et al.

(10) Patent No.: US 6,306,309 B2
(45) Date of Patent: Oct. 23, 2001

(54) METHOD FOR CLEANING SAND IN A SAND BED

(75) Inventors: Anders Ekenbäck, Södertälje; Klas Lange, Djursholm, both of (SE)

(73) Assignee: Weda Poolcleaner AB, Södertälje (SE)

( * ) Notice: Subject to any disclaimer, the term of this patent is extended or adjusted under 35 U.S.C. 154(b) by 0 days.

(21) Appl. No.: 09/765,336

(22) Filed: Jan. 22, 2001

Related U.S. Application Data

(62) Division of application No. 09/283,237, filed on Apr. 1, 1999, now Pat. No. 6,228,256.

(30) Foreign Application Priority Data

Apr. 8, 1998 (SE) .................................................. 9801246

(51) Int. Cl.⁷ .................................................. B01D 24/46
(52) U.S. Cl. ............................. 210/787; 15/1.7; 210/792
(58) Field of Search .................................. 210/670, 675, 210/792, 143, 170, 236, 241, 258, 270, 271, 747, 787, 788; 15/1.7

(56) References Cited

U.S. PATENT DOCUMENTS

| | | | |
|---|---|---|---|
| 1,150,876 | 8/1915 | Nichols | 210/270 |
| 2,346,216 | 4/1944 | Fraser | 210/270 |
| 2,389,329 | 11/1945 | Streander | 210/270 |
| 4,337,006 | * 6/1982 | Lacey | 210/170 |
| 4,378,290 | 3/1983 | Kennedy | 210/103 |
| 4,655,908 | * 4/1987 | Franzen | 210/270 |
| 4,818,419 | 4/1989 | Mims | 210/796 |
| 4,911,831 | 3/1990 | Davison et al. | 210/86 |
| 5,192,435 | 3/1993 | Francisco | 210/241 |
| 5,470,465 | * 11/1995 | Moorehead et al. | 210/205 |
| 5,902,488 | * 5/1999 | Prince | 210/747 |
| 6,017,400 | 1/2000 | Clark et al. | 134/21 |
| 6,115,864 | 9/2000 | Davidsson et al. | 15/1.7 |

FOREIGN PATENT DOCUMENTS

| | | |
|---|---|---|
| 2719485 | 11/1978 | (DE) . |
| 62183816 | 8/1987 | (JP) . |
| 62282608 | 12/1987 | (JP) . |
| 5155441 | 6/1993 | (JP) . |
| 10118698 | 5/1998 | (JP) . |

\* cited by examiner

*Primary Examiner*—Peter A. Hruskoci
(74) *Attorney, Agent, or Firm*—Walter Ottesen

(57) ABSTRACT

The invention relates to a method and an apparatus for cleaning the sand beds of slow sand filters, infiltration basins and pools of other types having sand beds in water treatment works and similar plants, while the filter is in service, by removing a few centimeters of the bed surface, cleaning the sand of the sludge or filter film formed on the bed surface, returning the cleaned sand to the bed, and discharging the separated sludge, suspended in water to drain or to a suitable disposal site. This is achieved using a tracked cleaning machine equipped with a submersible pump (7) and nozzle (8) to remove the top layer of sludge-bearing sand from the bed, cleaning the sludge from the sand thus removed in a hydrocyclone (13), returning the cleaned sand to the bed via a spreader plate (15) and discharging the water-suspended sludge to a drain or to a suitable disposal site through a hose (17).

2 Claims, 2 Drawing Sheets

METHOD FOR CLEANING SAND IN A SAND BED

This is a divisional of application Ser. No. 09/283,237, filed Apr. 1, 1999 now U.S. Pat. No. 6,228,256.

FIELD OF THE INVENTION

The invention relates to a method and an apparatus for cleaning the sand beds of slow sand filters, infiltration basins and pools of other types having sand beds in water treatment works and similar plants, while the filter is in service, by removing a few centimeters of the bed surface, cleaning the sand of the sludge, or filter film, formed on the surface, returning the cleaned sand to the bed, and discharging the separated sludge, suspended in water, to drain or to a suitable disposal site. This is achieved, while the slow sand filter or infiltration basin in question is in service, by traversing the surface of the sand with a tracked cleaning machine in a predetermined pattern which ensures that the entire surface has been traversed by the end of the cleaning operation.

BACKGROUND OF THE INVENTION

When using previously known methods of cleaning filters or basins of this type, the filter or basin in question must be removed from service and drained of water. A machine, such as a compact loader, is then used to remove the top layer of sand and transport it to a suitable location for cleaning. When the filter is refilled with water following cleaning of the bed, the filtered water must be discharged to waste for two to three weeks before the filter can be returned to normal service, since drying of the sand surface causes disturbance to the microbacterial activity in the bed. Every cleaning operation of this type takes approximately one month and requires the services of three plant workers and an outside contractor. Since two bed cleaning operations are normally carried out annually, involving the removal of a total of about 6 centimeters of sand, the filter must be refilled with sand every ten years.

SUMMARY OF THE INVENTION

The apparatus of the invention is for cleaning sand of a sand bed of a facility including a slow sand filter, infiltration basin and pools of other types having sand beds in water treatment works and similar plants. The apparatus includes: a chassis having a front end and a rear end; first and second caterpillar track assemblies mounted on respective longitudinal sides of the chassis; a motor mounted on the chassis and being operatively connected to the caterpillar track assemblies for driving the caterpillar track assemblies for propelling the apparatus over the sand bed; electromagnetic clutches interposed between the motor and the first and second caterpillar track assemblies, respectively; a submersible pump mounted at the front end and having a nozzle through which sand to be cleaned of sludge is drawn by suction from the sand bed; a hydrocyclone also mounted on the chassis and being connected to the submersible pump for receiving the sand to be cleaned and separating the sludge therefrom; the hydrocyclone having a first outlet through which the sludge is discharged from the hydrocyclone and a second outlet through which the cleaned sand is discharged; a spreader device mounted below the second outlet for spreading the cleaned sand onto the sand bed; a hose connected to the first outlet for conducting the sludge away from the hydrocyclone and the apparatus; and, a control unit for controlling the electro-magnetic clutches for changing the direction of movement of the apparatus as well as controlling the submersible pump, the hydrocyclone and the motor.

The suction nozzle at the front of the machine extends the full width of the machine and is connected to the submersible pump having a capacity sufficient to remove a layer of sand and sludge approximately 3 centimeters thick, and to convey the material thus removed to a hydrocyclone in which the sand is cleaned and redeposited on the bed behind the machine, while the water-suspended sludge is discharged to waste through a hose.

The hydrocyclone operates pursuant to the same principle as a cyclone for removing dust from an air flow. The inlet of the flow is arranged tangential in the upper cylindrical part of the cyclone and all heavy particles are thrown to the periphery of the cyclone because of centrifugal force and drop down through the outlet below while the cleaned air goes out through the upper outlet in the center of the cyclone. The hydrocyclone operates in the same way but separates heavy sand particles from a liquid flow, in this case a water flow. The separated sludge suspended in water is discharged to a waste disposal location at poolside through a hose connected to the hydrocyclone.

The method of the invention employs the above apparatus, which is remote-controlled, to traverse the surface of the sand bed, while the filter is in service, in a predetermined pattern such that the entire surface has been traversed by the end of the cleaning operation.

The time required to clean a filter approximately 2,430 m$^2$ in area is approximately 8 hours, including placement of the cleaning machine in, and removal of the machine from the filter while the unit is in service, representing a very significant saving in time compared to earlier methods.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
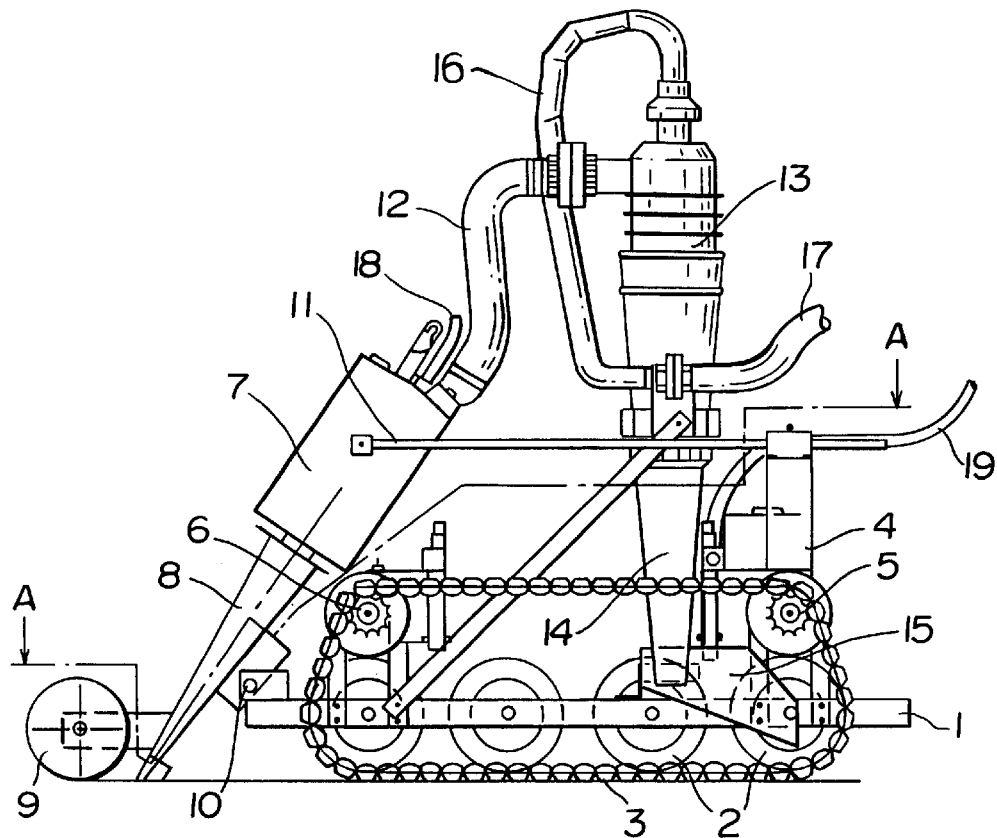
FIG. 1 is a side elevation view of an embodiment of the cleaning machine of the invention.
Figure 2:
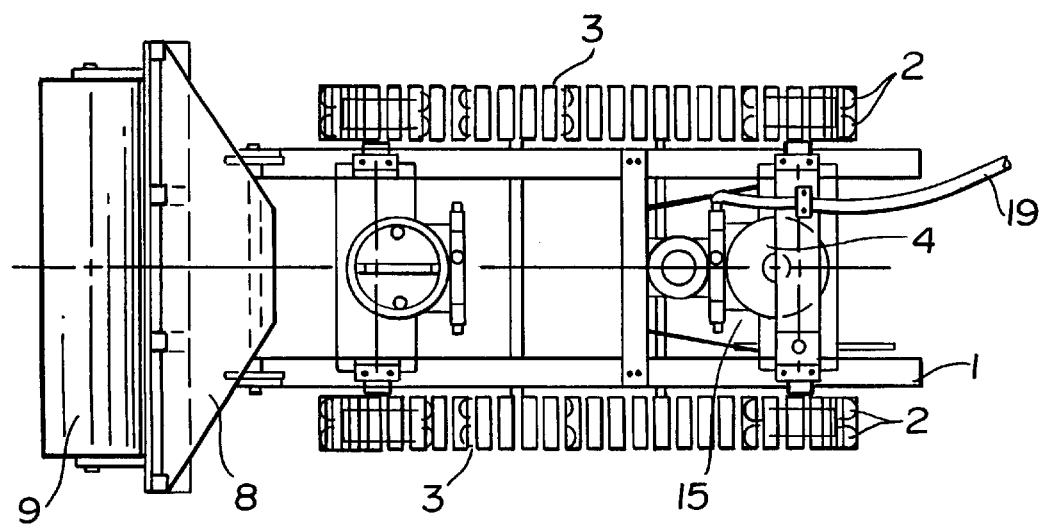
FIG. 2 is a section view of the cleaning machine taken along line A—A of FIG. 1; and, FIG. 3 is a schematic showing the control apparatus including the control station, connecting box, motor and electromagnetic clutches.

As shown in FIGS. 1 and 2, the chassis 1 is mounted on four pairs of double wheels 2 encircled, respectively, by right-hand and left-hand caterpillar tracks 3 on respective sides of the machine.

The tracks are driven by a fully-enclosed worm-gear motor 4, which is mounted centrally at the rear of the chassis and which, through a stub axle projecting from either side and provided with an electro-magnetic clutch (5a, 5b), drives each set of tracks via an individual sprocket drive wheel 5 in engagement therewith. The front end of the machine is also equipped with a common shaft with electro-magnetic clutches (6a, 6b) connected to the sprocket idler wheels 6 in engagement with the caterpillar tracks 3 at the front. The sprocket idler wheels 6 are not connected to the worm-gear motor 4 but are driven in rotation by the caterpillar tracks 3. The purpose of the electromagnetic clutches is to release and brake the caterpillar track on the side towards which the machine is to be steered when turning.

The front end of the machine is equipped with a submersible pump 7 provided with a suction nozzle 8, which widens outwardly at the lower end to extend the full width of the machine. At the lower end, the nozzle is provided with a support roller 9 which rests on the sand bed of the filter. To achieve the required depth of suction in the bed, the pump, suction nozzle and support roller assembly are adjustable in the vertical direction about the pivot joint 10 by means of the adjusting rod 11 which can be, for example, manually adjusted before the machine is placed on the sand bed.

The sand, sludge and water extracted from the bed are discharged by the pump 7 through the hose 12 to a hydrocyclone 13, in which the sand is cleaned of the sludge and, through the conical lower part 14 of the hydrocyclone, falls onto the spreader plate 15, from where it is returned to the filter bed. The water-suspended sludge is discharged from the top of the hydrocyclone through the pipe 16 and hose 17 to a drain or to a suitable disposal site at the top side or poolside of the slow sand filter or infiltration basin.

The power supply cable 18 to the pump 7 and the power supply cable to the worm-gear motor 4, as well as the necessary control wiring, are enclosed in a floating hose 19, which is run from a connecting box 20 on the chassis 1 to a suitable control station 22 at poolside of the slow sand filter or infiltration basin.

To prevent twisting of the floating hose 19 and the discharge hose 17 during the cleaning operation, the machine is operated over the sand bed in a figure-eight pattern until the entire surface has been cleaned.

Figure 3:
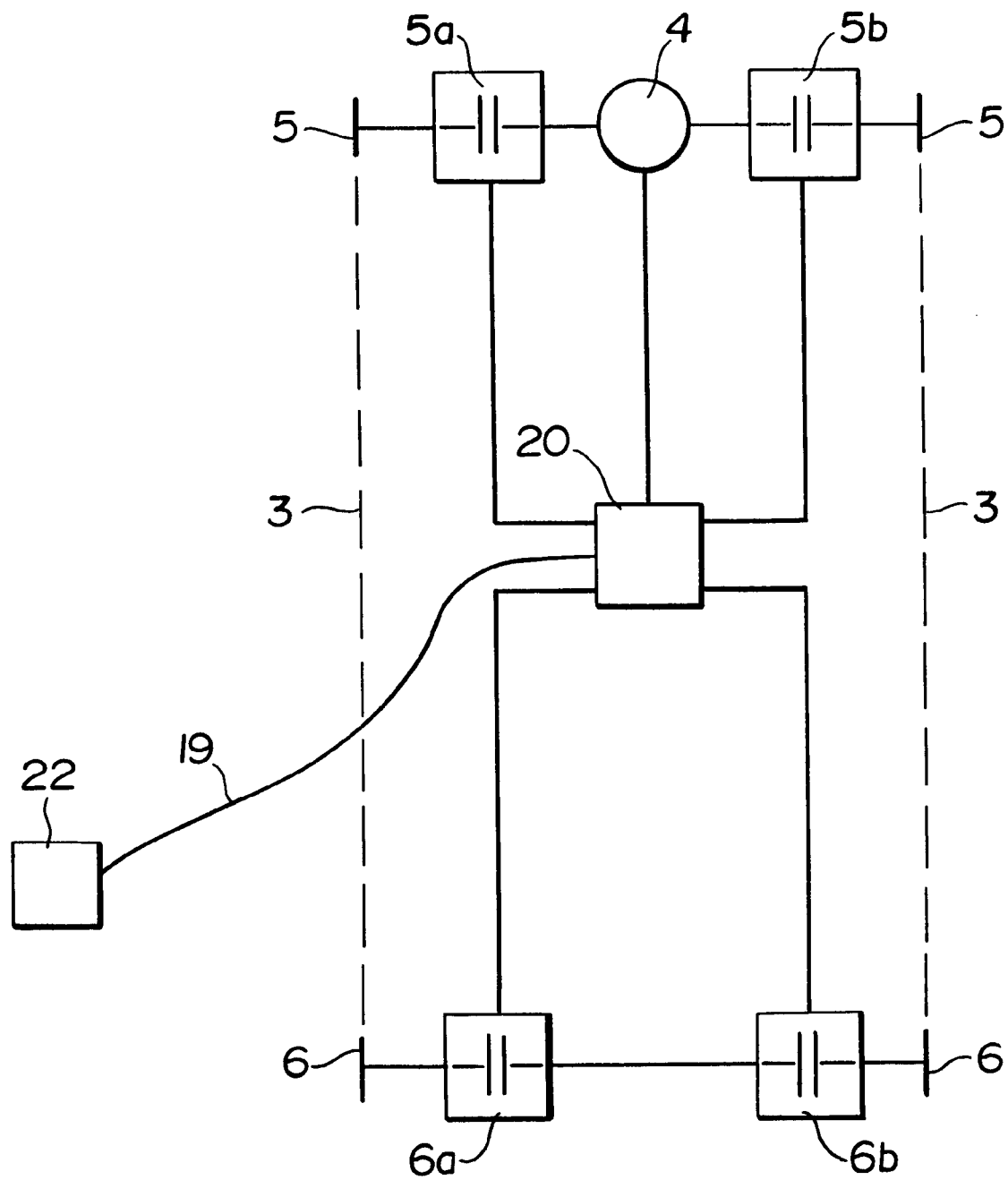

FIG. 3 is a schematic showing the connecting box 20 mounted on the chassis 1. Electro-magnetic clutches (5a, 5b, 6a, 6b) are connected to the electrical connecting box 20 as is the motor 4.

It is understood that the foregoing description is that of the preferred embodiments of the invention and that various changes and modifications may be made thereto without departing from the spirit and scope of the invention as defined in the appended claims.

What is claimed is:

1. A method for cleaning sand of a sand bed of a facility including a slow sand filter, infiltration basin and pools having sand beds in water treatment works and plants, the method comprising the steps of:

providing a remote-controlled cleaning machine including a chassis having a front end and a rear end; first and second caterpillar track assemblies mounted on respective longitudinal sides of said chassis; first and second drive wheels for engaging said first and second caterpillar track assemblies, respectively; a motor mounted on said chassis; electromagnetic clutches connected to said drive wheels; said motor being connected to said drive wheels via said electro-magnetic clutches for driving said caterpillar track assemblies for propelling said machine over said sand bed; and, a submersible pump having a nozzle and a hydrocyclone connected to the submersible pump;

traversing said sand bed;

removing sand to be cleaned of sludge from the top surface of said sand bed with said submersible pump and said nozzle thereof;

discharging said sand to be cleaned to said hydrocyclone to separate said sludge from said sand;

discharging the separated sludge suspended in water to a waste disposal location of said facility through a hose connected to said hydrocyclone; and, returning the cleaned sand to said sand bed.

2. The method of claim 1, wherein the machine further includes a control apparatus including a control station at said facility; and, wherein the method comprises the further step of providing a power supply cable for said pump and a power supply cable for said motor and control wiring for controlling said machine; and, accommodating said cables and control wiring in a floating hose which extends between said control station and said machine.

\* \* \* \* \*